United States Patent Office 3,491,478
Patented Jan. 27, 1970

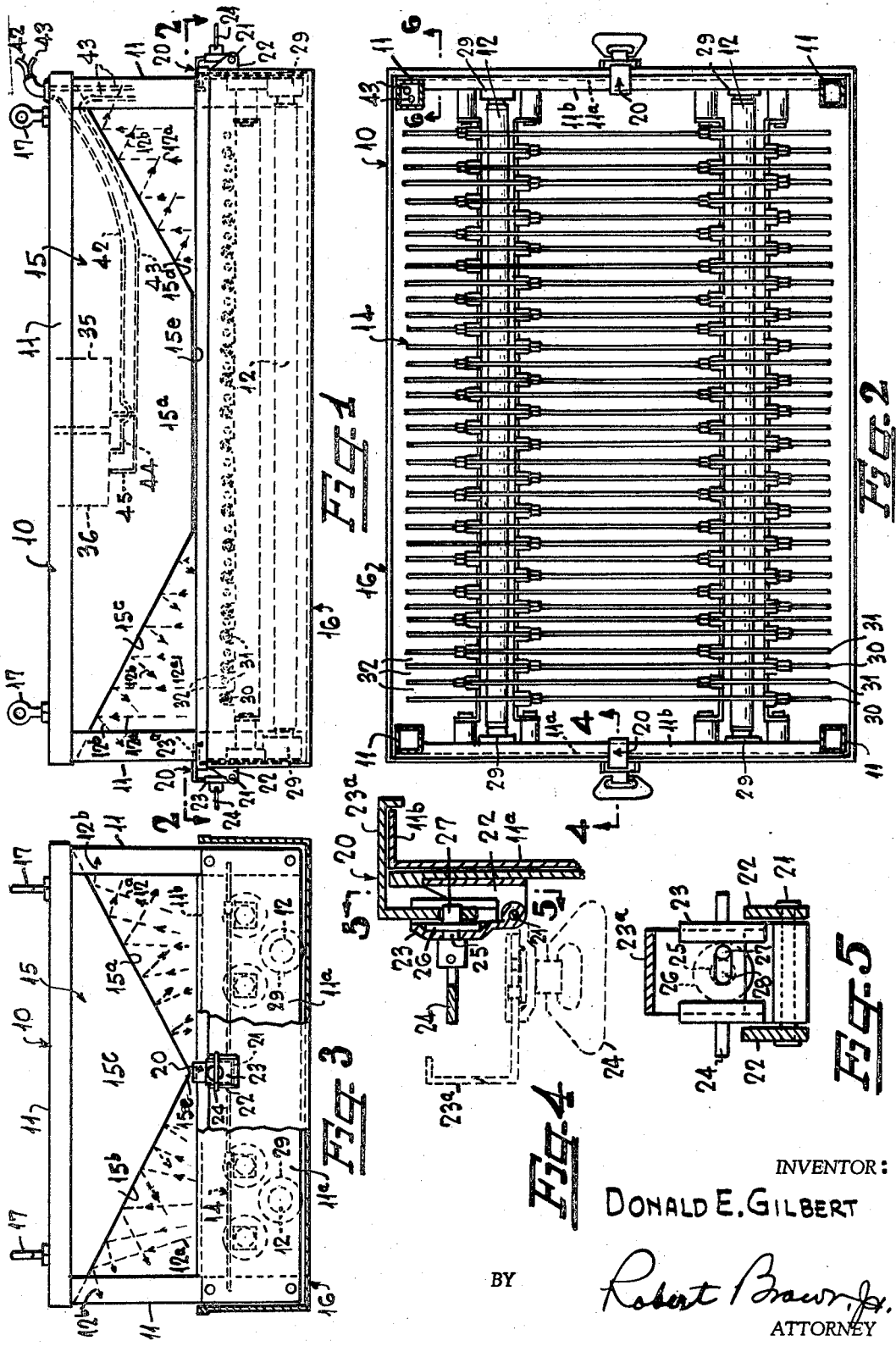

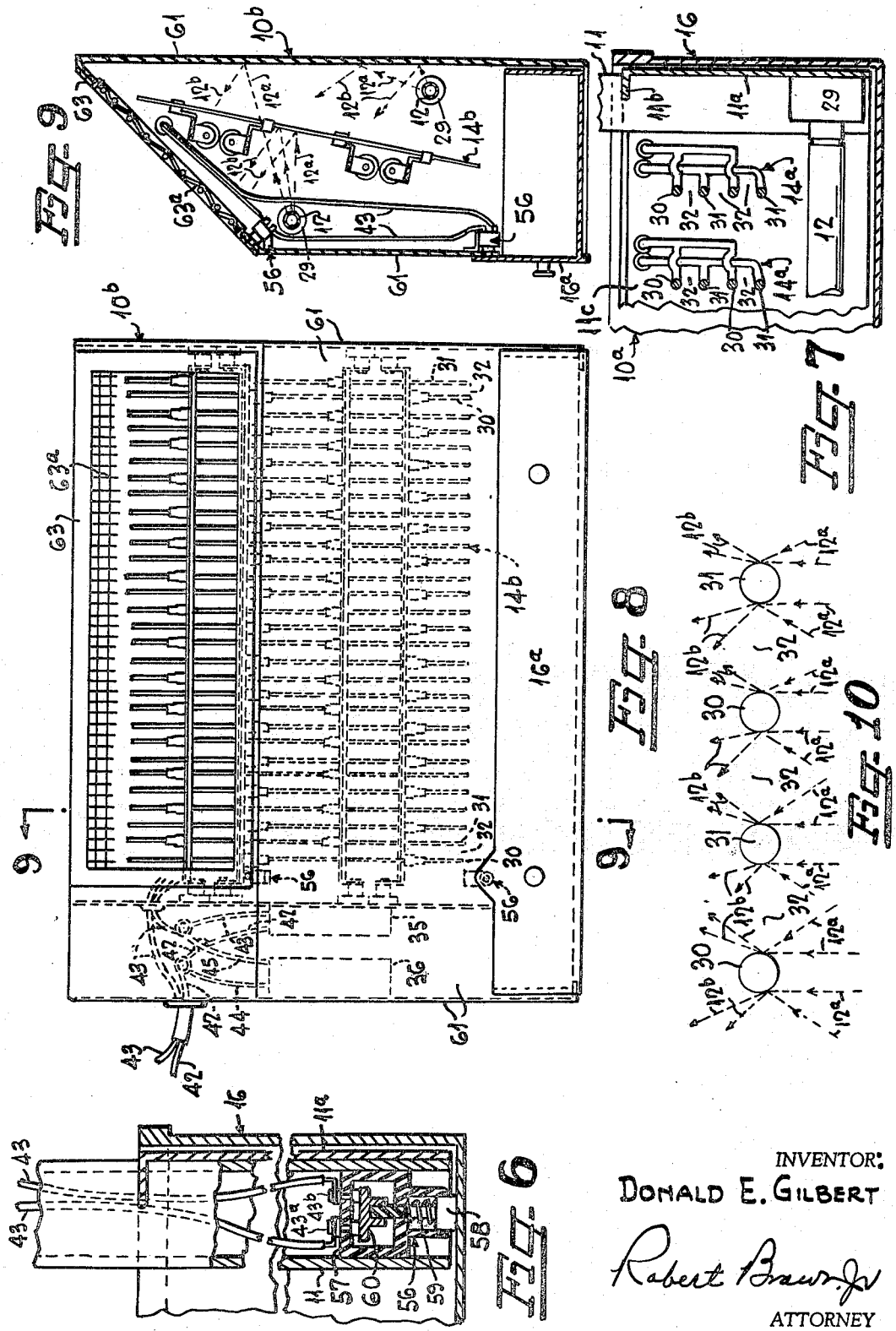

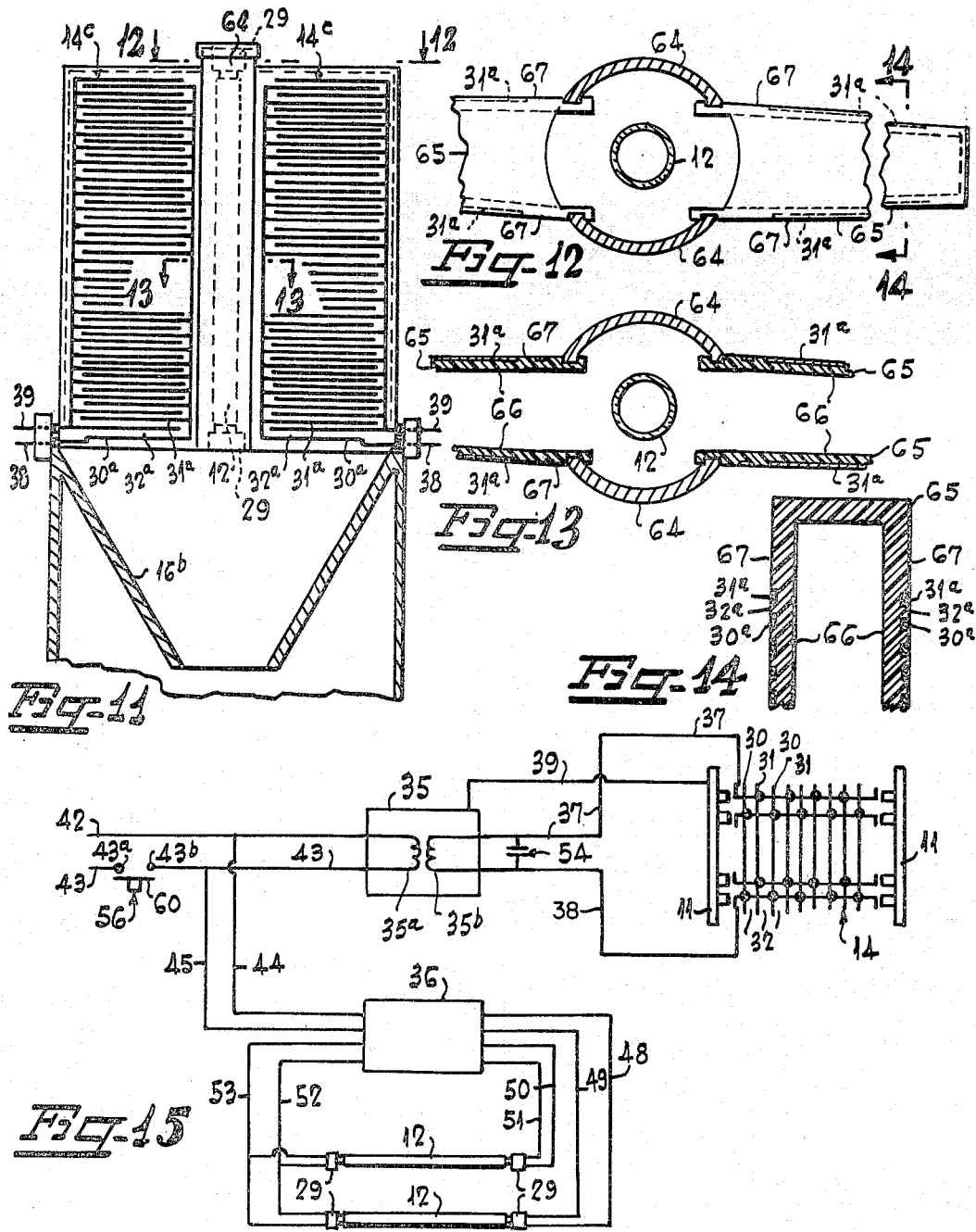

3,491,478
TRAPS FOR FLYING INSECTS
Donald E. Gilbert, Jonesboro, Ark., assignor to Gilbert Electronics, Inc., Jonesboro, Ark.
Filed Apr. 1, 1968, Ser. No. 722,523
Int. Cl. A01m 1/22
U.S. Cl. 43—112                    14 Claims

ABSTRACT OF THE DISCLOSURE

A trap in which predominantly diffused light is employed to attract flying insects to a killing element. The element may consist of an electrified grid and a grid circuit which operates upon contact by insects to momentarily produce two successive effects, namely, an increase in the corono field and voltage potentials sufficient to electrocute the insects and possibly cause some to adhere to the grid, and then a reduction in the potentials to release any adhering insects.

---

This invention relates to insect control devices having improved means for attracting, killing and collecting flying insects of various species. Devices of the class described usually include an attracting lamp, a killing element, and a chamber for collecting the killed insects.

For more than thiry years, scientists have diligently sought to improve the effectiveness of light spectrums for use as attractants in insect control apparatus. Prior research has demonstrated that light of optimum attractiveness varies for different species of insects and, moreover, the species are influenced by the size, shape and brightness of the source.

Prior research has further demonstrated that fluorescent lights which emit their principal radiation in the near ultra-violet region of the electromagnetic spectrum (e.g. 3341 to 4047 angstroms actual wave length—3654 angstroms peak wave length) have been found preferable for general purposes, whereas, other wave lengths may prove more suitable in specific applications. For example, wave lengths ranging from 4700 to 5100 with the peak at 4900 angstroms are preferred for the boll weevil; and wave lengths ranging from 5800 to 6200 with the peak at 6000 angstroms are preferable for the fruit fly. The last-named range is also suitable for other types of flies at a temperature range between 55 and 65 degrees Fahrenheit (see Electric Insect Traps for Survey Purposes (January 1963), by Hollingsworth, Hartsock and Stanley).

So far as applicant is aware, the prior art insect traps embodying the above subject matter have been used with an attractant composed either of entirely direct light or a combination of a predominant direct light and reflected light of selected wave lengths respectively. In either case, the resultant light is accompanied by a glare which severely reduces insect attraction by repelling a substantial percentage of insects within the area sought to be controlled. Furthermore, conventional insect traps have not been satisfactory when used in food processing areas because the collecting means for the killed or injured insects often permitted them to escape and contaminate the food.

Applicant's research has revealed that the attractiveness of light to flying insects varies in a direct proportion to the degree of light diffusion and, consequently, that a diffused black light or other color spectrum is more effective as an attractant than either an entirely direct light or a predominant direct light mixed with reflected light.

It is therefore an object of this invention to provide a trap for flying insects in which the attractant consists of predominantly diffused light of a wave length appropriate for the species of insects to be trapped.

It is another object of the invention to provide an insect trap having an electrified grid for a killing element, in combination with means responsive to contact by the insect with the grid for momentarily fluctuating the field and voltage potentials between an insect-killing and insect-adhering magnitude and a relatively lower magnitude at which the adhering insect will be released to fall into a collection chamber.

It is a further object of the invention to provide an insect trap of the type described in the immediately preceding paragraph in which the corona field of the grid serves as a cover or insect-escape barrier for the collection chamber thereby rendering the trap suitable for use in food processing areas.

It is another object of the invention to provide an insect trap composed of an electrified grid for killing the insects, and a combined baffle and light-diffusing surface for respectively attracting and ricocheting the attracted insects into the corona field of the grid and thence upon the grid. By this arrangement, the insect flies against the light-diffusing bafflle surface and is immobilized by the impact concurrently with being diverted into the corona grid field. The immobilization or stunning effect of the insect immediately before entering the corona field renders it incapable of reversing its direction of travel to avoid entering the field. In absence of the impact, the insect sometimes senses the corona field and does not enter it.

It is yet another object of the invention to provide a trap in which light is employed to attract insects to an electrocution element composed of an electrical circuit printed upon a light-diffusing background, the printed circuit and background serving as a combined attracting and destroying member.

Some of the objects of invention having been stated, other objects will appear as the description proceeds when taken in connection with the accompanying drawings, in which:

FIGURE 1 is a side elevation of my improved omnidirectional insect trap having a horizontally disposed grid for electrocuting insects;

FIGURE 2 is a sectional plan view taken along line 2—2 in FIGURE 1;

FIGURE 3 is a view, partially in elevation and partially in section, looking at the left-hand portion of FIGURE 1;

FIGURE 4 is an enlarged sectional detail view taken along line 4—4 in FIGURE 2, showing a latch mechanism for releasably attaching the insect collection chamber of the trap, said mechanism being illustrated in bold-line attaching and in dotted-line detaching positions;

FIGURE 5 is a sectional view taken along line 5—5 in FIGURE 4;

FIGURE 6 is an enlarged sectional detail view taken along line 6—6 in FIGURE 2, showing a safety switch;

FIGURE 7 is a sectional view through a modified embodiment of the invention as disclosed in FIGURES 1–6, but showing a plurality of vertically disposed grids instead of a single horizontal grid;

FIGURE 8 is an elevation of another embodiment of the invention in which an insect trap is incorporated within a unidirectional wall-type housing;

FIGURE 9 is a transverse vertical sectional view taken along line 9—9 in FIGURE 8;

FIGURE 10 is a schematic view illustrating the manner in which direct light rays are reflected and diffused by the convex surfaces of the grid electrodes;

FIGURE 11 is a view, partially in elevation and partially in section, of another embodiment of the invention in which the electric grid is composed of electrodes printed in the surface of a light-diffusing material;

FIGURE 12 is a sectional plan view taken along line 12—12 in FIGURE 11;

FIGURE 13 is a sectional plan view taken along line 13—13 in FIGURE 11;

FIGURE 14 is a vertical sectional view taken along line 14—14 in FIGURE 12;

FIGURE 15 is an electrical wiring diagram especially designed for the embodiment of invention illustrated in FIGURES 1–6 and typical for the remaining embodiments with slight variations or additions; and FIGURE 16 is a wiring diagram showing the direction of a safety switch for use in conjunction with the diagram of FIGURE 15, and specifically adapted to the embodiment shown in FIGURES 8 and 9.

Referring more particularly to the drawings, the numeral 10 broadly denotes an omnidirectional insect trap comprising a framework 11, light sources 12, 12, an electric grid 14, a combined light-diffusing and insect-deflecting baffle 15 and an insect collection compartment 16. Suitable eye bolts 17 are provided at the upper portion of the framework to permit suspension of the trap from a support such as the ceiling of a room. Preferably, the trap is suspended at approximately eight feet above the floor for indoor use in trapping houseflies, stable flies, face flies, horse flies, and numerous other species of flying insects.

The light sources or tubes 12 may be either black light or other types suitable for attracting the particular species of insects to be trapped. Black light fluorescent tubes are most commonly employed for attracting photopositive nocturnal flying insects, while incandescent light is preferable for other species such as mosquitoes.

Tubes 12 are removably mounted between the end walls 11a, 11a at the lower portion of framework 11 by means of insulators 29, 29. Also mounted between the end plates 11a and above the tubes 12 is a grid 14 which will be described later.

The collection compartment 16 is rectangular, the two opposite end walls of which are detachably supported by by framework end walls 11a, 11a by means of latches 230, 230, respectively. The bottom and side walls of compartment 16, when attached, shield or screen from view the bottom and sides of tubes 12 and grid 14. It will be observed that the upper horizontal perimeter of the compartment opening is disposed somewhat above the upper surface of grid 134 and further serves as a means for confining the insects upon the grid at the moment of electrocution. Although direct light from tubes 12 is visible from above, the glare from this angle has little effect upon approaching insects since they normally fly horizontally at or below the upper perimeter of the collection chamber and in the space illuminated by predominately diffused light. Even when the insects fly slightly higher than the upper perimeter of the collection chamber, direct light is not visible until with in a few inches of the light-diffusing surface of baffle 15.

As hereinafter used, the expression "predominantly diffused light" means a light which is either entirely diffused or else sufficiently diffused to substantially dissipate or offset the glare from any accompanying direct light for purposes of attracting insects to a killing element.

The latch 20 is pivotally secured as at 21 to bracket 22 on the outside surface of the end wall of compartment 16, said latch comprising a strap 23 upon which an inverted U-shaped retention member 23a is telescopically mounted (FIGURES 4 and 5). When compartment 16 is in attached position, the member 23a hooks over the upper lateral edge of end wall 11a as shown in bold lines in FIGURE 4. Member 23a may be extended longitudinally of strap 23 from its bold-line to the dotted-line position by rotating handle 24 through an angle of approximately 90 degrees (FIGURE 5), said handle being rotatably mounted as at 25 in strap 23 and having a disk 26 fixedly secured thereon in face-to-face contact with the strap. Disk 26 is provided with an eccentrically disposed pin 27 extending perpendicularly from its face into a slot 28 in the telescopically mounted retention member 23a (FIGURE 5). Thus, when handle 24, disk 25 and pin 27 are rotated, the retention member 23a will be moved longitudinally relative to strap 23 whereby the compartment is attached and detached from the framework 11.

The combination light-diffusing and insect-deflecting baffle 15 has four divergent faces 15a, 15b, 15c and 15d. The faces 15a and 15b diverge upwardly and outwardly from an apex or bend line 15e, said bend line being disposed horizontally and at substantially the same elevation as the upper perimeter of the opening of compartment 16. Similarly, the faces 15c and 15d diverge upwardly and outwardly, but from spaced points at the opposite ends of the bend line 15e.

The deflecting light diffusing surfaces 15a through 15d, as well as the surfaces of grid 14 and collection compartment 16, may be anodized aluminum or other material with diffusely pitted or dimpled configurations to break up, deflect and diffuse the direct light rays from tubes 12 so as to illuminate the paths of the horizontally flying insects with predominantly diffused light. Tests have demonstrated that anodized aluminum surfaces are especially effective in the production of diffused light for insect attracting purposes and, further, that the effectiveness varies in a direct proportion to the degree of diffusion and the area of the surface. Hence, a larger surface with the same degree of diffusion increases the effectiveness.

During operation, the horizontally flying insects at or below the upper perimeter of collection compartment 16 are exposed to entirely diffused or predominantly diffused light from the anodized surfaces 15a through 15d and are thereby induced to fly toward and against these surfaces, which surfaces deflect the insect downwardly upon grid 14 to be electrocuted. FIGURES 1, 3 and 9 indicate by arrows 12a the paths of the direct rays from tubes 12 and by arrows 12b the paths of the diffused rays which have been angularly reflected by the anodized surfaces. It is of course evident that upon diffusion of rays 12b that the latter will travel in an infinite number of directions about the central path indicated by the arrow.

The electric grid 14 comprises a plurality of pairs of electrodes or conductors 30 and 31, each pair being connected in parallel and spaced apart to form a gap 32 therebetween. The presence of an insect at one of the gaps will cause current to flow from one electrode, through the insect, and to the other electrode to effect electrocution, after which the electrocuted insect will, in most instances, fall into collection compartment 16.

The electrical circuit for grid 14 is schematically illustrated in FIGURE 15, said circuit including a transformer 35, a fluorescent ballast 36, and a pair of tubes or lamps 12. Wires 37 and 38 connect electrode bars 30 and 31 respectively, to the secondary winding 35b of transformer 35, said transformer being grounded to framework 11 through a wire 39. The primary transformer winding 35a is supplied current from a suitable source (not shown) through wires 42 and 43.

The ballast 36 receives current from wires 42 and 43 by means of wires 44 and 45 respectively, said ballast supplying current to the tubes 12 through wires 48, 49, 50, 51, 52 and 53 in a conventional manner.

It is important to note that a capacitor or condenser 54 is connected in parallel between wires 38 and 39, the wires leading to grid 14 and to the secondary transformer winding 35b. When an insect contacts grid 14 to cause current to flow from one electrode, through the insect, to the other electrode as previously described, the capacitor 54 causes the corona field and voltage potentials to momentarily fluctuate between a relatively high insect-killing magnitude and a lower magnitude at which any adhering insect will be released from the grid to fall into the collection chamber 16 therebelow.

Actual tests have proven that the use of a grid voltage above 4200 may produce injury when the grid or circuit is touched with human hands. Also, a grid voltage of 4200 may cause some of the electrocuted insects to adhere and burn with a flame to produce objectionable odors. On the other hand, a grid voltage of 2500 or less will neither produce physical injury nor satisfactorily kill a volume of insects without also creating smoke and offensive odors. Thus, it has been found that a voltage between 2500 and 4500 is desirable for electrocuting insects and for safety reasons, but objectionable in that insects may adhere to the grid and create offensive odors.

The capacitor 54 remedies the above-described objection and makes possible the use of a grid voltage ranging between 2500 and 4500 for general purpose insect electrocution.

Adherence of insects to grid 14 is due, in part, to the strength of the corona discharge field and the electromagnetic field. A distinction between these two fields is important. High voltage creates a proportionately strong corona discharge field, whereas current creates a proportionately strong electromagnetic field, both fields being necessary to hold an insect or object upon the grid. In the disclosed embodiment of invention, only nine milliamps of current flows through the secondary of the grid; consequently, there is not enough current to create an electromagnetic field of measurable quantity. Nevertheless, a corona discharge field controlled by the voltage is present. The fly or insect often senses danger from the latter voltage and shies away from the grid.

The action of capacitor 54 is in opposition to the reactance of transformer 35. Since the capacitance is the opposite of reactance, there is impedance. Therefore, the capacitor 54 opposes, overrides, or otherwise permits the transformer to discharge a higher usable effective voltage as measured on meters.

It should be further noted that the transformer has a peak voltage that is not measured by a common meter, the latter measuring what is known and recognized as the useful of effective voltage of that transformer. The capacitor, by overriding the reactance, then permits the usable voltage to increase in proportion to the size and type of capacitor being used up to the peak voltage which is not always known in a given transformer. Stated differently, the capacitor improves the power factor of the transformer. It is also known that the capacitor strength is not a continuous force against the reactance, therefore, the variations of the corona discharge field is in direct proportion to the reduction of the effective voltage when an insect makes contact with the grid.

It is known from experience that a capacitor removed from a parallel connection in a high voltage source will retain a supply of voltage for a matter of a few seconds. This characteristic may be exhibited by crossing the terminals of the capacitor, removing the latter from the secondary circuit, and then observing a spark fifteen or twenty seconds after the removal. The capacitor will dissipate or lose its effectiveness to oppose the transformer reactance to cause the voltage to be lowered momentarily whereby permitting an adhering insect to fall from the grid section.

Since the field strength varies in direct proportion to the voltage, and since the optimum voltage range will produce a field strength which will cause adherence of some of the insects to the grid, it has been found desirable to employ an initial high voltage at the instant of electrocution and a subsequent reduced voltage to prevent adherence and to release any adhering insects. For electrocuting small insects such as the housefly, the momentary optimum killing voltage has been found to be about 4000, which voltage does not produce excessive arcing, renders the grid harmless to human touch, but at the same time effectively kills and dehydrates the insect. Since there is an occasional insect adherence when using a voltage of 4000, the capacitor 54 is employed in combination with a 3200 volt transformer having 120 volts at its primary source of electrical power. The capacitor 54 is 20 kv., 500 mmfd. in this particular instance.

The existing voltage on the grid at the time the insect makes contact is approximately 4000 or the highest usable or effective voltage that the transformer is capable of discharging with a 500 mmfd., 20 kv. capacitor. There is a surge to about 4500 volts for a millisecond, then down to an effective voltage of 4000, and then down to 3200 volts. If insects adhere to the grid, the voltage will continue to drop to as low as 500 proportioned to the length of strength of short circuit. Also, at the moment of insect contact the capacitor 54 loses its ability to increase the effective voltage of the transformer; consequently, the transformer returns to its normal usable or effective voltage of approximately 3200, or even less if the insect continues to short circuit. At this point, the insect is released by the reduction in voltage and, hence, the reduction in the strength of the corona discharge field.

By comparison, a regular 4000 volt, 9 milliamp transformer having an effective or usable voltage of 4000 will not lower its voltage when an insect contacts the grid, but instead, will continue to dissipate the effective voltage of 4000 unless shorted out and also retain its effective corona discharge field which tends to hold the insect.

It is thus seen that the action of capacitor 54 is its ability to increase the effective or usable voltage of the transformer until an insect or other object short circuits the grid 14 thereby overriding or disabling the capacitor in such a manner that it returns to 3200 volts or lower as previously stated. The capacitor is reactivated after release of an adhering insect from the grid.

Experimentation has revealed a decisive difference in the snap or hotness of the spark dissipated on a 3000 volt rated transformer by a capacitor, as compared to a transformer with a 4000 volt rating.

Briefly stated, there is a peak 4000 voltage discharge at the moment of insect contact with the grid which electrocutes and dehydrates the insect; a period of less than one second for the electrocuted insect to fall free of the grid at the original 3200 effective voltage and a correspondingly lower corona field strength; and an immediate ability to discharge 800 volts by the capacitor for the next operation.

It will be noted that grid 14 is substantially shielded from human touch during operation by means of the attached collection chamber 16. When chamber 16 is detached, however, the grid is exposed and, unless the current is disconnected, may be unsafe for operation. It is therefore desirable to provide means for automatically disconnecting the current supply when the chamber 16 is removed, both as a safety precaution and to prevent electrocuted insects from falling at random therebelow.

FIGURES 6 and 15 show a switch assembly 56 especially designed to effect the above precautions, said switch being adapted to be held in closed position by the attached collection chamber 16, and operable automatically upon detachment of the chamber to break the grid circuit.

Switch 56 is installed in current supply line 43 and comprises a housing 57, a plunger 58 slidably mounted in the housing, a spring 59 for yieldably urging one end of the plunger downwardly and against the bottom of the assembled chamber or compartment 16, a switch bar 60 on the upper end of the plunger, and terminals 43a and 43b adapted to be connected and disconnected by the switch bar upon attachment and detachment respectively of the compartment. The assembly 56 is fixed to framework 11 so that the plunger will be moved upwardly to switch-closing position by the attached compartment.

FIGURE 7 is a detailed illustration of a modified form of trap 10a in which a plurality of vertically disposed grids 14a are employed instead of the single horizontal grid 14 of FIGURES 1-6. The grids 14a are spaced apart a greater distance than the spacing between the previously described electrode bars 30 and 31 in FIGURES 1-6; however, the electrode bars 30 and 31 of the vertical grid have substantially the same spacing as before. The grids 14a are spaced sufficiently close to have overlapping corona discharge fields but are not close enough to permit arcing from one grid to the other.

With this arrangement, the insects will be electrocuted as before, but with the added advantage of permitting the larger electrocuted insects to more readily fall into the collection compartment therebelow due to the wider spacing between the vertical grids 14a. The grids 14a are mounted between spaced plates 11c, 11c on framework 11.

FIGURES 8 and 9 illustrate a unidirectional or wall type insect trap 10b which is best suited for operation at about two feet above the floor level when used indoors. Trap 10b consists of housing 61 and a grid 14b inclined relative to the vertical at an angle from 10 to 30 degrees. The electrode bars 30 and 31 of grid 14b are spaced substantially as previously described to permit the smaller insects to pass therebetween while being electrocuted. At the same time, any insects which are too large to pass between the electrodes will slide downwardly along the contact face of the grid and into the collection drawer 16a therebelow.

As in the preceding embodiments, the direct light rays follow the paths 12a and are converted into diffused rays by the anodized diffusely pitted surfaces of the grid and the interior of housing 61, after which the diffused rays scatter substantially about angularly reflected paths 12b to attract the insects. Likewise, the direct light rays are not visible to a horizontally flying insect until it has approached within a few inches of the grid where reversal of its path of travel is most difficult. The corona discharge field of grid 14b serves as a cover for collection compartment 16a and bars escape of any partially destroyed or killed insects therefrom.

The upper portion of trap housing 61 has an inclined opening therein covered by a frame 63, said frame being provided with an open mesh grille 63a through which insects fly when approaching the grid 14b and which also serves as a window for passage of the attracting diffused light rays. The grille 63a prevents contact of the grid by human hands and discourages the use of the trap by employees as a waste receptacle.

The embodiment shown in FIGURES 8 and 9 employs two of the previously described safety switches 56, one of the switches being located between collection drawer 16a and the trap housing 61, and the other switch 56 between frame 63 and the trap housing (FIGURES 9 and 16). When the parts 16a and 63 are properly positioned for normal operation of the trap, both of the switches 56 are in closed position so that current will be supplied to the grid 14b. On the other hand, when either or both of the parts 16a and 63 are detached or improperly positioned, the grid will be automatically disconnected from the current supply by means of one or both switches.

FIGURES 11 through 14 show another type of insect trap 10c comprising a vertical opaque housing 64, a vertical tube or lamp 12, the combination grid and light-diffusing wings 65, 65, and a collection compartment 16b beneath the wings. The wings 65 are preferably made of light-diffusing translucent material so that none of the direct light rays from source 12 will be visible from the outside thereby displaying completely diffused light on the outer surface 67 of the wings to attract the insects.

The exterior surface 67 of each of the wings 65 is characterized by a printed electric grid 14c comprising a plurality of pairs of substantially parallel electrodes 30a and 31a separated by spaces 32a into which the insects enter to be electrocuted as previously described. In other words, when an insect alights upon the wing surface 67 and between electrodes 30a and 31a, current will flow from one electrode, through the insect, and to the other electrode, after which the insect will be released to fall into the collection compartment 16b therebelow.

In the drawings and specification, preferred forms of the invention have been disclosed; and although specific terms are employed, these are used in a descriptive sense and not for purposes of limitation.

I claim:

1. In a trap for flying insects having a killing element, a light source, and means for shielding said light source from view in a space extending vertically and horizontally of the source, means for attracting the insects to said killing element comprising a pitted aluminized surface for predominantly diffusing the direct light rays emanating from said source, said attracting means being positioned for angularly reflecting said diffused rays in a second vertically and horizontally extending entrance space disposed adjacent said shielded space.

2. A trap for flying insects as defined in claim 1 wherein said aluminized surface is anodized.

3. A trap for flying insects as defined in claim 2 wherein the range of wave lengths of said predominantly diffused light is substantially between the limits of 3341 to 6200 angstroms.

4. A trap for flying insects as defined in claim 3 wherein said killing element includes at least one pair of spaced electrodes, and further comprising a circuit for supplying current to said electrodes, means for detachably mounting said attracting means, and switch means controlled by said attracting means for disconnecting said circuit upon detachment of the attracting means.

5. A trap for flying insects as defined in claim 2 wherein the wave lengths of said predominantly diffused light is in the ultraviolet range of substantially between 3341 to 3800 angstroms.

6. A trap for flying insects as defined in claim 1 wherein said killing element comprises at least one pair of upright electric grids, each of said grids having at least one pair of spaced electrode bars positioned to discharge electrical energy from one bar through an intermediately disposed insect to the other bar, said grids having overlapping corona discharge fields but spaced apart sufficiently to prevent electrical discharge from one to the other whereby the insects electrocuted at the electrode bar will fall from between the spaced grids, said substantially uniform width.

7. A trap for flying insects as defined in claim 6, wherein said grid bars are longitudinally inclined relative to the vertical at an angle between 10 and 30 degrees.

8. A trap for flying insects as defined in claim 7, wherein the outer surfaces of said bars are diffusely pitted anodized aluminum.

9. A trap for flying insects as defined in claim 1, wherein said killing element comprises an electric grid having at least one pair of spaced electrodes, and means for supplying electrical energy to said electrodes, and diverting the flying insect onto the grid.

10. In a trap for flying insects having an electric grid composed of at least a pair of spaced electrodes, and a light source, an insect attracting device comprising a pitted aluminized surface for predominantly diffusing the direct light rays from said source, and means for mounting said surface to respectively angularly reflect said diffused rays relative to said direct rays and to deflect the attracted flying insects onto said electrodes.

11. A trap for flying insects as defined in claim 10 wherein said aluminized surface is anodized.

12. A trap for flying insects as defined in claim 11 wherein the range of wave lengths of said predominantly diffused light is substantially between the limits of 3341 to 6200 angstroms.

13. A trap for flying insects as defined in claim 11 wherein the wave lengths of said predominantly diffused light is in the ultraviolet range of substantially between 3341 to 3800 angstroms.

14. A trap for flying insects as defined in claim 10 wherein said surface is detachably mounted, and further comprising a circuit for supplying current to said grid, and switch means controlled by said surface mounting means for disconnecting the circuit upon detachment of said mounted surface.

References Cited

UNITED STATES PATENTS

| | | | |
|---|---|---|---|
| 1,486,307 | 3/1924 | Seefluth et al. | 43—112 |
| 1,899,199 | 2/1933 | Kaiser | 43—112 X |
| 1,962,420 | 6/1934 | Bradley | 43—112 |
| 2,052,945 | 9/1936 | Scott | 43—112 |
| 2,098,647 | 11/1937 | Lindsley | 43—112 |
| 2,177,846 | 10/1939 | Swangren | 43—112 |
| 2,835,071 | 5/1958 | Partridge | 43—112 |
| 3,077,050 | 2/1963 | Makara | 43—112 |
| 3,321,862 | 5/1967 | Peek | 43—112 |

FOREIGN PATENTS

| | | |
|---|---|---|
| 1,390,253 | 1/1965 | France. |
| 373,240 | 4/1923 | Germany. |

WARNER H. CAMP, Primary Examiner